United States Patent
Pfaff et al.

(10) Patent No.: US 7,734,030 B2
(45) Date of Patent: Jun. 8, 2010

(54) DIAL PLAN GENERATOR

(75) Inventors: John Pfaff, Sea Bright, NJ (US); James Medica, Aldie, VA (US); Dipesh J. Modi, Chantilly, VA (US); Stephen V. Minshew, McLean, VA (US); Kevin Borror, Winchester, VA (US); Mark Zekra, Ashburn, VA (US)

(73) Assignee: Time Warner Cable Inc., New York, NY (US)

( * ) Notice: Subject to any disclaimer, the term of this patent is extended or adjusted under 35 U.S.C. 154(b) by 1021 days.

(21) Appl. No.: 11/148,784

(22) Filed: Jun. 9, 2005

(65) Prior Publication Data

US 2006/0291643 A1   Dec. 28, 2006

(51) Int. Cl.
*H04M 7/00* (2006.01)
(52) U.S. Cl. .......................... 379/220.01; 379/114.01; 379/221.14; 379/222; 379/224
(58) Field of Classification Search ............ 379/114.01, 379/220.01, 221.14, 222, 224
See application file for complete search history.

(56) References Cited

U.S. PATENT DOCUMENTS 6,327,349 B1 * 12/2001 Rollins ................. 379/114.27
6,490,345 B2 * 12/2002 Fleischer et al. ....... 379/114.01

* cited by examiner

*Primary Examiner*—Ahmad F Matar
*Assistant Examiner*—Khai N Nguyen
(74) *Attorney, Agent, or Firm*—The Marbury Law Group, PLLC

(57) ABSTRACT

Telephone numbering data comprising an NPA code associated with an NXX code that is associated with a rate center identifier is received at a dial plan instruction writer. Local call data relative to a home rate center is also received. The local call data determine whether a call originating in the home rate center is charged as a local call, a toll call, or a long distance call. Routing rules to be applied to a called telephone number originating from the home rate center are determined based on the telephone numbering data and the local call data. Instructions executable by the telephone switch that implement the routing rules are generated.

17 Claims, 5 Drawing Sheets

DIAL PLAN GENERATOR

BACKGROUND

Embodiments of the present invention relate to the provision of telephony services. More particularly, embodiments of the present invention are directed to an automated system for generating dial plans for telephone switching equipment.

With the passage of the Telecommunications Act ("the Act") of 1996, an incumbent local exchange carrier (ILEC), the regulated entity that owns and administers an existing access network, must provide to a requesting telecommunications carrier (hereinafter generally referred to as "Competitive Local Exchange Carrier" or "CLEC") nondiscriminatory access to network elements on an unbundled basis and allow CLECs to combine such network elements in order to provide telecommunications services. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc.

The increasing popularity of high speed data (HSD) over cable and the emergence of voice over IP (VoIP) technology as a viable alternative to the public switched network (PSTN) has provided cable operators an opportunity to offer a full range of VoIP-based telephony services, offering custom features and advanced intelligent network services that rival the ILECs.

A cable operator desiring to provide VoIP services directly to customers either acts as a CLEC or partners with a CLEC. In this capacity, the cable operator manages not only the HSD network but a telephone switch (variously referred to as a softswitch, media gateway controller, call agent, or a gatekeeper) that manages calls originating from, and terminating with, subscribers. In addition to managing VoIP calls on the network, the telephone switch manages the routing of calls to and from the PSTN.

FIG. 3 illustrates the network components of a Packet-Cable-compliant system. Referring to FIG. 3, a managed IP network 325 is shown connected to a Fiber 320A and to the PSTN 350 through a trunking media gateway 340. (VoIP over cable under the PacketCable standard differs from VoIP services provided over the Internet in that the service is not delivered over the public Internet but over a managed IP network.)

The access network 315A connects a subscriber's cable modem (CM) 305A and multimedia (or media) terminal adapter (MTA) 310A to the CMTS 320A at the cable headend. The MTA 310A handles voice compression, packetization, security, and call signaling to support a standard telephone 300A and a fax machine (not shown) through an RJ-11 connector. An MTA 310A may be designed to be either a separate standalone device or to be embedded within the CM 305A (an EMTA). The MTA 310A and the CM 305A are assigned separate media access control (MAC) and IP addresses even if the elements are integrated into a single device.

The CMTS 320A uses the Data Over Cable Service Interface Specification (DOCSIS) 1.1 protocol (also issued by Cable Television Laboratories, Inc.) on the access network 315A to manage access network resources for PacketCable services. Access network 315A resources are first reserved when service is requested, then committed when service is delivered, and finally released when the service has completed. Softswitch 330 manages and maintains a call state for VoIP services and controls the MTA 310A.

The PacketCable Specification specifies various devices for signaling, call control, and connectivity. A signaling gateway (SG) provides SS7 signaling to the PSTN. A media gateway controller (MGC) provides signaling to the media gateways, such as the cable modem termination system (CMTS) and the media gateway (MG). The MG provides connectivity to the PSTN. A call management system (CMS) provides call control within the network, primarily call setup and tear down.

FIG. 3 illustrates a number of these components. By way of illustration, softswitch 330 provides signaling gateway (SG), media gateway control (MGC), and CM functionality. The softswitch functions as the center for call control. It provides call features, maintains call state, and controls every call setup and teardown. Additionally, the softswitch has full control over the residential gateways in the network and routes calls to the appropriate destinations, such as to other MTAs or traditional phones. This functionality is provided by two subsystems, a call agent (CA) 332 and an element management system 336 (EMS).

CA 332 provides call logic and call control functions, maintaining call state for every call in the network, and performs the CMS, MGC, and SG functions specified in the PacketCable Specification. The CA 332 includes service logic for supplementary services, such as, Caller ID, Call Waiting, and also interacts with application servers to supply services that are not directly hosted on the call agent. The CA 332 participates in signaling and device control flows originating, terminating or forwarding messages. There are numerous relevant protocols in use on the call agent, including: SIP, MGCP/NCS, SS7, and AIN. Call agents also produce details of each call to support billing and reconciliation.

The EMS 336 is a mediation device between a network management system (NMS) (not illustrated) and a call agent 332. The EMS 336 facilitates the provisioning, administration, reporting, and billing features of the softswitch 330.

On-net to off-net calls are handled by trunking media gateway 340. The trunking media gateway 340 connects directly to a CLEC switch (class 4 or 5) and provides a gateway between a digital phone network and the PSTN 350.

The CA 332 interacts with the MTA 310A and other functional entities to establish calls by using the device control functions provided by network-based call signaling (NCS) Protocol. A gate controller (GC) (not illustrated) maintains a policy database and interacts with the MTA 310A and the gate function of the CMTS 320A to coordinate the quality-of-service (QoS) authorization, admission control, and related channel attributes configuration.

Several different types of signaling are deployed in a digital phone network. All of the signaling protocols work together to push a call through the network.

Media gateway control protocols are used by the media gateway controller (MGC) to control media gateways in a digital phone network. Media Gateway Control Protocol (MGCP) also known as RFC2705/RFC 3435 is a Network Working Group specification. Megaco, also known as H.248, was co-developed by the ITU and the Megaco Working Group. The Session Initiation Protocol (SIP) was developed to control various SIP-enabled end devices. If a media gateway is SIP-enabled, then SIP becomes a media gateway control protocol. The Common Open Policy Service (COPS) is used between the softswitch and CMTS for gate-control communication.

At the subscriber level, network-based call signaling (NCS) is used. NCS is a simplified version of MGCP developed specifically to control embedded digital phone client devices in a PacketCable environment.

The network services signaling protocols allow the softswitch to communicate with other networks. The primary protocols used for this purpose are Signaling System 7 (SS7) as illustrated in FIG. 3 (345), SIP and/or CMSS. SS7 is the network service signaling protocol that supports softswitch communications with the PSTN. SIP is designed to control SIP enabled endpoints. Any device in the network can be a SIP endpoint, even another softswitch. Various telecommunications service providers are implementing SIP soft switches as an alternative to SS7.

The PacketCable specifications uses SIP with extensions that support local and custom local area signaling services (CLASS) services generally supported in a telephony network. This protocol is referred to as Call Management Server Signaling (CMSS).

IP communications use the Real-time Transport Protocol (RTP) and the Real-time Transport Control Protocol (RTCP) to negotiate the connections between IP devices. RTP provides end-to-end network transport functions for applications transmitting real-time data, such as audio, video or simulation data, over multicast or unicast network services. RTP does not address resource reservation and does not guarantee quality-of service for real-time services. The data transport is augmented by the RTCP control protocol that allows monitoring of the data delivery in a manner scalable to large multicast networks while providing minimal control and identification functionality. RTP and RTCP are designed to be independent of the underlying transport and network layers.

Bearer connectivity refers to the connection of the physical interfaces that actually carry the voice traffic. As previously noted, signaling traffic is carried separately from voice traffic. In a true digital phone network, all data (voice and data) traffic would be carried over an IP-based infrastructure. However, since today's telephone network is made up of time division multiplexed (TDM) connections, there must be a mechanism to pass traffic to the TDM network as well as the IP network.

From a cable operator's perspective, there are two types of telephone calls. On-Net Calls are calls that are carried entirely on the digital phone network and do not interface with the PSTN. Off-Net calls are calls that must traverse the PSTN to reach their destination. Off-net calls are carried through the trunking media gateway to the PSTN. The trunking media gateway translates the IP voice packets into the TDM format and sends them out to the PSTN. The connection between the trunking media gateway and the PSTN is through inter-machine trunks or IMTs. IMTs are generally high bandwidth (DS3) connections that connect directly to the CLEC Class 5 switch.

One of the components of the telephone switch is a dial plan. A dial plan provides the basic functionality to meet customer requirements for calling and called number analysis. The rule set used by a switch to determine, for every combination of calling party and dialed digits, how to route the call (e.g. international, long distance, toll, local, on-net, off-net or "vacant code") is called a dial plan. Calls that are determined to be "on-net" are routed according to the "on-net" components of the dial plan.

The dial plan specifies what types of service requests can be accommodated by a telephone switch based on the call setup information, the calling number, the called number, and the routes, trunk groups, and trunks (individual circuits) available to the telephone switch. The dial plan determines how each and every call that comes into telephone switch is processed.

As calls arrive in the call processing system, the originating and terminating telephone numbers along with other data are evaluated to determine what call processing actions will be taken. Various actions can be implemented, such as call acceptance or rejection based on the calling or called number, what call control instructions are used, whether the call is on-net or off-net, and, for off-net calls, which egress trunk (or circuit) is ultimately selected to carry the call.

A typical dial plan is a single file organized as a set of tables, each in a different section. The different sections are linked lists of values to be used after number analysis is completed.

The North American Numbering Plan (NANP), on which all U.S. telephone numbers are currently based, is an integrated telephone numbering plan serving nineteen North American countries that share its resources. The NANP is administered by a North American Numbering Plan Administrator (NANPA). NANP numbers are ten-digit numbers consisting of a three-digit Numbering Plan Area (NPA) code, commonly called an area code, followed by a three digit central office code, also known as exchanges or prefixes, and a four-digit local, or line, number. The format is usually represented as NPA-NXX-XXXX where N is any digit from 2 through 9 and X is any digit from 0 through 9. Each area code is divided geographically into rate centers, geographic areas that are billed as if they were a single location.

Rate centers are a holdover from the days when a separate switch was needed for almost every community, and so calls between communities—even within a LATA—were "rated" as toll calls. When each rate center corresponded to a discrete switch, every rate center/switch needed its own NXX. Currently, a single Class 5 typically serves multiple rate centers. By way of illustration, in Maine, 133 rate centers are served by 15 host switches and 13 smaller switches.

Despite the technological realities, the rate center concept still determines the numbering scheme of the wired telephone system. Currently, two different rate centers served out of the same Class 5 switch must each have their own NXX, no matter how few lines each represents. The reason is that the prefix designates the local switching equipment. When a call is placed to NPA-NXX-XXXX, the telephone network examines the area code and prefix in order to route the call to the correct switch. The far-end switch then selects the correct line based on the line number. Because carriers do not typically share a local switch, each prefix must designate both the wire center, the location of the switch, and the carrier.

The numbering plan is not static. Area codes are added (either by splitting an existing area into two NPAs or overlaying a second area code on a single NPA) to accommodate number shortages and because of competitive demands. Alternatively, rate centers can be consolidated to make more efficient use of the blocks of numbers that are issued under a single area code or added. Such changes have a significant impact on the way telephone switches are configured. Dial-plans, in particular, are huge tables of routing rules that undergo significant churn in response to these changes to the NANP.

By way of illustration, an 878 NPA was added in Pennsylvania to serve the same area served by the 412 and 724 area codes. With the overlay, a new dial plan was implemented requiring that after a "permissive period" all calls within the 412, 724 and 878 areas were to be dialed as 10-digits, and all calls outside 412, 724, and 878 were to be dialed as 1+10-digits. While the change was made to a region in Pennsylvania, all telephone switching systems were required to be modified to reflect the new NPA in the dial plan and to require 10-digit and 1+ten-digit dialing. Had the 878 NPA been added by splitting one of the other two NPAs, the impact on dial plans would have been more significant.

A telephone switch also generates billing information based on the service types defined in the dial plan. Off-net service types typically fall within one of the following groups:

"Offshore" NPAs—calls terminating at an NPA outside a rate center LATA and outside a single-rate long distance service plan.

Long Distance NPAs—calls terminating at an NPA outside a rate center LATA that are within a single-rate long distance service plan.

Intra-LATA Toll—calls terminating at an NPA within a rate center LATA that are outside the local calling area and are billed at local toll rate.

Intra-LATA Local—calls terminating at an NPA within a rate center LATA that are within the local calling area that are not subject to toll charges.

Inter-LATA Local—calls terminating at an NPA outside a rate center LATA that are within the local calling area that are not subject to toll charges.

The service types are established by industry representatives and reflected in reports issued by the NANPA. LATAs are defined by NANPA. But local calling areas are actually defined by each local service provider's local service tariffs. Typically, service providers mimic the ILEC/RBOC tariffs with regard to local calling areas, since the end users are accustomed to the ILEC's tariffs.

A telephone switch dial plan must be modified to accommodate changes in the NANP as, for example, changes in the NPA and changes in the rate center. Otherwise, a call may not be completed and/or a call may not be properly billed. By way of illustration, assume that the NXX code 995 is established within the 212 NPA within a LATA 132. Since calls from outside LATA 132 are routed based only upon the 3-digit NPA (assuming a ten-digit dialing area), this new NXX does not present connect problems for calls originating from outside LATA 132. However, for a call originating within a LATA, the NPA and the NXX are required to determine whether a call is local or toll. Until the telephone switch is updated to incorporate a rule for routing calls to the new NXX code of 995, a switch serving LATA 132 will not process calls originating within LATA 132 to the 212-995 exchange, and will instead route calls to a "your call cannot be completed as dialed" announcement.

What would be useful is a dial plan generator that would receive data reflecting changes in the NANP and produce instructions in a form executable by a telephone switch to implement those changes.

SUMMARY

An embodiment of the present invention provides a method for writing a dial plan of a telephone switch. Telephone numbering data is received on an ongoing basis from the NANPA. Telephone numbering data comprises NPA code associated with an NXX code. The NXX code is associated with a rate center identifier. Local call data relative to a home rate center is received on an ongoing basis from state public utility commissions (PUCs) as ILECs evolve their local service tariffs. The local call data determine whether a call originating in the home rate center is charged as local call, a toll call, or a long distance call. Routing rules to be applied to a called telephone number originating from the home rate center are determined based on the telephone numbering data and the local call data. Instructions executable by the telephone switch that implement the routing rules are generated.

It is an aspect of the present invention to manage a call dial plan of a telephone switch in response to changes in the NANP and ILEC local service tariffs.

It is another aspect of the present invention to generate executable commands that affect changes in a dial plan in response to changes in the NANP, so that these commands, which can number several hundred thousand per switch, can be submitted to the switches without human intervention.

It is yet another aspect of the present invention to use a dial plan generator to manage changes to dial plans in a multi-division telephone system.

It is still another aspect of the present invention to revise a dial plan in response to changes in the NANP in a manner that minimizes errors.

It is another aspect of the present invention to use a dial plan generator to manage changes to calls that are "on-net."

These and other aspects of the present invention will become apparent from the general and detailed description that follows.

According to an embodiment of the present invention, billing rules based on the telephone numbering data and the local call data are generated. In an exemplary embodiment of the present invention, generating billing rules comprises generating an offshore billing rule for calls terminating at an NPA outside the home rate center LATA and outside a single-rate long distance service plan, generating a long distance billing rule for calls terminating at an NPA outside the home rate center LATA that are within a single-rate long distance service plan, generating an intra-LATA toll billing rule for calls terminating at an NPA within the home rate center LATA that are outside the local calling area and are billed at a local toll rate, generating an intra-LATA local billing rule for calls terminating at an NPA within the home rate center LATA that are within the local calling area that are not subject to toll charges, and generating an inter-LATA local billing rule for calls terminating at an NPA outside the home rate center LATA that are within the local calling area that are not subject to toll charges.

An embodiment of the present invention provides a method for writing a dial plan of a telephone switch. Telephone numbering data relative to a home rate center and local call data relative to the home rate center are received. The telephone numbering data and the local call data are used to generate instructions executable by the telephone switch that implement a routing rule to be applied to a call originating from the home rate center. The routing rules are used to generate billing rules.

In order to generate instructions executable by the telephone switch that implement a routing rule to be applied to a call originating from the home rate center, an offshore routing instruction for a call terminating at an NPA outside the home rate center LATA and outside a single-rate long distance service plan is generated. Additionally, a long distance routing instruction for a call terminating at an NPA outside the home rate center LATA is generated. Further, an intra-LATA toll routing instruction for a call terminating at an NPA within the home rate center LATA is generated. An intra-LATA local billing rule is applied to revise the intra-LATA toll routing instruction for a call terminating at an NPA within the home rate center LATA that is within a local calling area to generate an intra-LATA local routing instruction. Additionally, an inter-LATA local billing rule is applied to generate an inter-LATA local routing instruction for a call terminating at an NPA outside the home rate center LATA that is within the local calling area.

According to another embodiment of the present invention, the method for writing a dial plan of a telephone switch further comprises receiving on-net block data and using the on-net block data to generate instructions executable by the telephone switch that implement a routing rule to be applied to a called number native to the switch.

According to another embodiment of the present invention, a dial plan generator comprises a processor and an instruction writer. The processor receives telephone numbering data and local call data relative to a home rate center. The processor stores the telephone number data and local call data. The instruction writer receives the stored telephone number data and local call data. Based on the telephone numbering data and the local call data to be applied to a call originating from the home rate center, the instruction writer determines routing rules. The instruction writer also generates instructions executable by the telephone switch that implements the routing rules.

According to an embodiment of the present invention, routing rules comprise an offshore routing instruction for a call terminating at an NPA outside the home rate center LATA and outside a single-rate long distance service plan, a long distance routing instruction for a call terminating at an NPA outside the home rate center LATA, an intra-LATA toll routing instruction for a call terminating at an NPA within the home rate center LATA, an intra-LATA local routing instruction generated from an intra-LATA local billing rule as a revision to an intra-LATA toll routing instruction, and an inter-LATA local billing rule for a call terminating at an NPA outside the home rate center LATA that is within a local calling area.

In another embodiment of the present invention, the processor receives and stores on-net block data. The instruction writer uses the on-net block data to generate instructions executable by the telephone switch that implement a routing rule to be applied to a called number native to the switch.

In yet another embodiment of the present invention, the processor generates billing rules based on the routing rules.

Yet another embodiment of the present invention provides a method for switching calls following establishment of a new local exchange within a LATA. Updated telephone numbering data and updated local call data relative to a home rate center are received. Instructions executable by the telephone switch that implement updated routing rules to be applied to a call originating from the home rate center are generated. The instructions are sent to the switch. A call directed to the new local exchange received at the switch is routed in accordance with the instructions. The updated routing rules are used to generate billing rules and the billing rules are used to generate bills.

In order to generate instructions executable by the telephone switch that implement a routing rule to be applied to a call originating from the home rate center, an offshore routing instruction for a call terminating at an NPA outside the home rate center LATA and outside a single-rate long distance service plan is generated. Additionally, a long distance routing instruction for a call terminating at an NPA outside the home rate center LATA is generated. Further, an intra-LATA toll routing instruction for a call terminating at an NPA within the home rate center LATA is generated. An intra-LATA local billing rule is applied to revise the intra-LATA toll routing instruction for a call terminating at an NPA within the home rate center LATA that is within a local calling area to generate an intra-LATA local routing instruction. Additionally, an inter-LATA local billing rule is applied to generate an inter-LATA local routing instruction for a call terminating at an NPA outside the home rate center LATA that is within the local calling area.

According to another embodiment of the present invention, a dial plan generator comprises a processor and an instruction writer. The processor receives updated telephone numbering data and updated local call data relative to a home rate center. The processor stores the updated telephone number data and local call data.

The instruction writer receives the stored updated telephone number data and updated local call data. Based on the telephone numbering data and the local call data to be applied to a call originating from the home rate center, the instruction writer updates routing rules.

The telephone switch receives the instructions from the instruction writer and switches a call received at the switch to the new local exchange in accordance with the instructions.

Another embodiment of the present invention provides a method for billing telephone calls originating from within a home rate center. Telephone numbering data and local call data relative to a home rate center are received. Off-net instructions are generated that are executable by the telephone switch that implements off-net routing rules to be applied to a call originating from the home rate center that is directed to a telephone number that is off-net. The off-net instructions are applied to the switch. An off-net call received at the switch is routed in accordance with the off-net instructions. Billing for the call is based on the routing of the call.

In order to generate off-net instructions executable by the telephone switch that implement off-net routing rules to be applied to a call originating from the home rate center that is directed to a telephone number that is off-net, an offshore routing instruction for a call terminating at an NPA outside the home rate center LATA and outside a single-rate long distance service plan is generated. Additionally, a long distance routing instruction for a call terminating at an NPA outside the home rate center LATA is generated. Further, an intra-LATA toll routing instruction for a call terminating at an NPA within the home rate center LATA is generated. An intra-LATA local billing rule is applied to revise the intra-LATA toll routing instruction for a call terminating at an NPA within the home rate center LATA that is within a local calling area to generate an intra-LATA local routing instruction. Additionally, an inter-LATA local billing rule is applied to generate an inter-LATA local routing instruction for a call terminating at an NPA outside the home rate center LATA that is within the local calling area.

In another embodiment of the present invention, on-net block data is received and stored. Using the on-net block data, instructions executable by the telephone switch that implement a routing rule to be applied to a called number native to the switch are generated. The on-net instructions are applied to the switch. The on-net call received at the switch is routed in accordance with the on-net instructions. The on-net call is billed based on the routing of the call.

Yet another embodiment of the present invention provides a method for writing a dial plan of a telephone switch. Telephone numbering data is received. Using the telephone numbering data, NPA-NXX strings are mapped to LATA identifiers and the LATA map is stored. Using the LATA map, an offshore routing instruction for a call terminating at a LATA outside the home rate center LATA and outside a single-rate long distance service plan is generated. Using the LATA map, a long distance routing instruction for a call terminating at a LATA outside the home rate center LATA within a single-rate long distance service plan is generated. Using the LATA map, an intra-LATA routing instruction for a call terminating within the home rate center LATA is generated.

DETAILED DESCRIPTION

Figure 1:
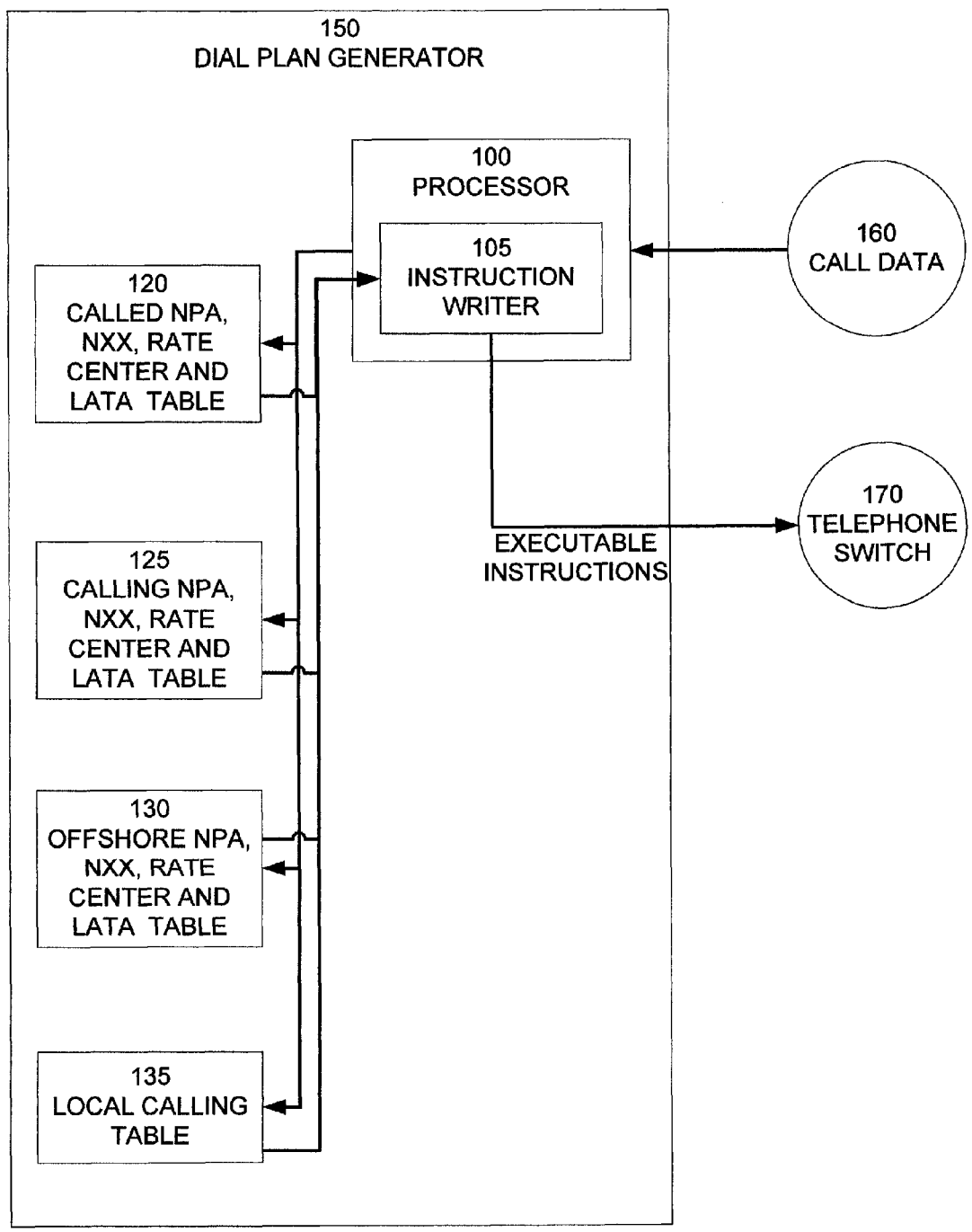
FIG. 1 illustrates a block diagram of the logical components of a dial plan generator according to an embodiment of the present invention.

The following definitions are provided for the purpose of clarity:

Bearer connectivity—Refers to the connection of the physical interfaces that actually carry the voice traffic.

COPS—Common Open Policy Service. A protocol used for communications between a softswitch CMTS for gate-control communication.

DOCSIS™ Data Over Cable Service Interface Specification. A collection of standards issued by Cable Television Laboratories, Inc. and directed to the provision of high speed digital services over HFC cable networks.

LATA—Local access and transport area. A geographic region assigned to one or more telephone companies for providing communication services. A connection between two telephone companies within the same region is referred to as intraLATA. A connection between two local exchange carriers in different regions is called interLATA, which is the same as long-distance service. Provisions guiding the use of LATAs are outlined in the Telecommunications Act of 1996.

Line number—This is the number assigned at the switch level to the phone line.

MGCP—Media gateway control protocol. A protocol used for communications between a softswitch and a trunking media gateway.

MTA—Multi-media or media terminal adapter. A gateway to the subscriber telephone. Converts an RTP stream to analog based on NCS commands sent from the softswitch. When embedded with a cable modem, the adapter may be referred to as an "EMTA."

NANP—The North American Numbering Plan is a system for three-digit area codes that direct telephone calls to particular regions on a public switched network (PSTN) where they are further routed by the local network. The North American Numbering PLan serves 19 North American countries that share it resources.

NCS—Network-based call signaling (NCS) protocol. A protocol used for communications between a softswitch and an MTA.

NPA Numbering plan areas, commonly referred to as area codes, are used to designate a specific geographic region, such as a city or part of a state.

NXX—Central office codes, also known as exchanges, prefixes, or simply NXXs, are the fourth, fifth and sixth digits of a ten-digit geographic NANP telephone number. NANPA assigns central office codes to state-authorized local service providers.

PacketCable™—A collection of standards issued by Cable Television Laboratories, Inc. and directed to the provision of digital telephone services over HFC cable networks.

Rate Center—A geographically specified area that defines where a calling party is calling from and the location where the call is directed to for billing purposes. Each NXX prefix is uniquely associated with a rate center. Thus, a calling party will be billed based on the distance between the rate center associated with the calling party's prefix and the rate center associated with the called party's prefix.

RTP—Real-time Transport Protocol.

SIP—Session initiation protocol.

Softswitch—Provides call control and feature delivery. Controls all the gateways in the network. Communicates with CLEC partner switches, via SS7 signaling, to set up off-net calls; communicates with eMTAs for on-net calls. Communicates with CMTS for legal intercept and eventually for gate management.

Trunking media gateway—Gateway to the CLEC partner switch for the actual voice traffic. Converts RTP streams into TDM and sends calls out over trunks based on MGCP commands sent from the softswitch.

An embodiment of the present invention provides a method for writing a dial plan of a telephone switch. Telephone numbering data is received on an ongoing basis from the NANPA. Telephone numbering data comprises an NPA code associated with an NXX code. The NXX code is associated with a rate center identifier. Local call data relative to a home rate center is received on an ongoing basis from the state PUC's. The local call data determine whether a call originating in the home rate center is charged as local call, a toll call, or a long distance call based on the NPA and/or NPA-NXX of the called number. Routing rules to be applied to a called telephone number originating from the home rate center are determined based on the telephone numbering data and the local call data. Instructions executable by the telephone switch that implement the routing rules are generated.

In an exemplary embodiment of the present invention, NPA, NXX, and rate center data (local call data) are received from NANP monitoring services. By way of illustration and not as a limitation, data is received from Telcordia's Local Exchange Routing Guide (LERG), Telcordia's Local Calling Area Data Source (LCADS), and from the North American Numbering Planning Association's (NANPA's) web site to keep current with new rate centers, NPA's, NXX's, and local tariff filings. These data are received on electronic media and queried to acquire the data required to write a dial plan.

In the exemplary embodiment, a dial plan generator receives queried data in the following form:

A called NPA table comprises a row for every NPA in the NANP that is in a different LATA than the home rate center of a switch, and every NPA-NXX that is in the local calling area of the home rate center that is served by the switch. It is used to generate default dial-plan definition command line interface commands that determine routing for long distance, toll and local call destinations.

A calling NPA table comprises a row for every NPA and NPA-NXX in the NANP.

An "offshore" NPA table comprises NPAs and NPA-NXX that are within the NANP but outside the single rate long distance boundaries.

A local calling table comprises rate center pairs, where the second rate center of the pair is defined to be within the local calling area of the first rate center.

When changes in the NANP are made that add, subtract, or split an NPA, add an NXX, add a rate center, change an NXX association with a rate center, or change a billing relationship between called and calling NPA-NXX, the values in the NPA tables and the local calling tables are updated. The dial plan is updated by applying software instructions to the table data to create commands that are executable by the telephone switch.

It should be noted that telephone calls are processed by the softswitch by looking for a routing instruction matching the largest substring of the dialed number. In other words, a routing instruction is first sought for the entire ten-digit dialed number, then for the first nine digits, and so on until the routing instruction is successfully matched. Since the softswitch dial-plan has a default routing instruction for every valid NPA, this algorithm is guaranteed to find a routing instruction for the first three digits of the dialed number, if not sooner.

FIG. 1 illustrates a block diagram of the logical components of a dial plan generator according to an embodiment of the present invention. Referring to FIG. 1, dial plan generator 150 comprises the following tables:

A called NPA table 120 comprises a row for every NPA in the NANP that is in a different LATA than a home rate center of a switch, and every NPA-NXX that is in the local calling area of the home rate center that is served by the switch. It is used to generate default dial-plan definition command line interface commands that determine routing for long distance, toll and local call destinations.

A calling NPA table 125 comprises a row for every NPA and NPA-NXX in the NANP.

An "offshore" NPA table 130 comprises NPAs and NPA-NXX that are within the NANP but outside the single rate long distance boundaries.

A local calling table 135 comprises rate center pairs, where the second rate center of the pair is defined to be within the local calling area of the first rate center.

Updates to the telephone industry data 160 are received by processor 100 and used to populate tables 120, 125, 130, and 135. The data from these tables are then read by processor 100 and used by instruction writer 105 to create instructions that are executable by a telephone switch 170.

In an embodiment of the present invention, instruction writer 105 receives telephone numbering data from tables 120, 125, and 130, and receives local call data from table 135. In this embodiment, telephone numbering data comprise an NPA, NXX, rate center, and LATA tuple. Additionally, local call data comprise local call data in the form of an NPA, NXX, rate center and LATA tuple. Using these data, instruction writer 105 generates routing instructions that permit a switch to assign an appropriate route for each call originating from the home rate center.

Calls to NPAs on the offshore table 130 are routed to a switch that handles "offshore" calls that are billed according to tariff rates. By way of illustration and not as a limitation, according to an embodiment of the present invention, a routing instruction for a telephone switch located in a home rate center identified as "memphis-tn" for a call directed to NPA 242 from that home rate center would be written by instruction writer 105 as:

add dial-plan id=dp-memphis-tn; digit-string=242; destination-id=mci-nanp."

By implementing this instruction, a telephone switch will direct calls originating from the home rate center to NPA 242 to a switching device identified as "mci-nanp."

The NPAs that in a foreign LATA that are not included in local calling table 135 are determined to be "long distance" calls. By way of illustration and not as a limitation, according to an embodiment of the present invention, a routing instruction for a telephone switch located in a home rate center identified as "memphis-tn" for a call directed to NPA 202 from that home rate center would be written by instruction writer 105 as:

add dial-plan id=dp-memphis-tn; digit-string=202; dest-id=mci-ld.

By implementing this instruction, a telephone switch will direct calls originating from the home rate center to NPA 202 to a switching device identified as "mci-ld."

NPA-NXXs that are within the same LATA as the home rate center and that are not on the local calling table 135 are "toll" calls and billed at a tariffed rate. By way of illustration and not as a limitation, according to an embodiment of the present invention, a routing instruction for a telephone switch located in a home rate center identified as "memphis-tn" in LATA 468 for a call directed to NPA=901, NXX=234 from that home rate center would be written by instruction writer 105 as:

add dial-plan id=dp-memphis-tn; digit-string=901-234; dest-id=mci-toll;

By implementing this instruction, a telephone switch will direct calls originating from the home rate center to 901-234 to a switching device identified as "mci-toll."

NPA-NXXs that are within the same LATA as the home rate center and that are on local calling table 135 are intra-LATA local calls for which no usage-based fee is accessed. In this way, local calling table 135 establishes exceptions to the long distance and toll designations that are applied to calls originating from an NPA-NXX within a home rate center based on its LATA and the LATA and NPA of the called number. By way of illustration and not as a limitation, according to an embodiment of the present invention, a routing instruction for a telephone switch located in a home rate center identified as "memphis-tn" in LATA 468 for a call directed to NPA=662, NXX=253 from that home rate center would be written by instruction writer 105 as:

change dial-plan id=dp-memphis-tn; digit-string=662-253; dest-id=mci-local.

By implementing this instruction, a telephone switch will direct calls originating from the home rate center to 662-253 to a switching device identified as "mci-local." It is important to note that the command string for this instruction is "change," not "add." In this exemplary embodiment of the present invention, the long distance instructions are written first, followed by the toll instructions. The NPA=662 is first used to generate an instruction that routes all NPA=662 to the switching device "mci-ld." The called NPA table 120 is then used to create instructions to route all calls from the home rate center to every NPA-NXX within the LATA as a "toll" call. Subsequently, the local calling table 135 is then used to overwrite the generic instruction for the specific NPA-NXX that are considered local calls and that are to be routed to the switching device "mci-local." Thus, the local calling table 135 is used to create exceptions to the long distance routing instructions.

The calling table 135 may include interLATA NPA-NXX numbers. By way of illustration and not as a limitation, according to an embodiment of the present invention, a routing instruction for a telephone switch located in a home rate center identified as "memphis-tn" in LATA 468 for a call directed to NPA=870, NXX=225 in LATA 528 from that home rate center would be written by instruction writer 105 as:

add dial-plan id=dp-memphis-tn; digit-string=870-225; dest-id=mci-local.

By implementing this instruction, a telephone switch will direct calls originating from the home rate center to 870-225 to a switching device identified as "mci-local." This instruction uses the "add" command because there is no toll associated with 870-225 (as in the case of the intraLATA numbers) and there is no previous instruction that needs to be overwritten.

In an embodiment of the present invention, a dial plan generator is implemented on open-source components of the Apache web server, the MYSQL database management system, and the PHP language. However, the PHP code uses standard SQL, and, as would be appreciated by those skilled in the art, could be adapted to operate on another database management system such as Oracle, or to run on Microsoft's IIS web server.

In an example set forth in the Background section, it was assumed that the NXX code 995 is established within the 212 NPA within a home rate center in LATA 132. Since calls from outside LATA 132 are routed based only upon the three-digit NPA (assuming a ten-digit dialing area), this new NXX does not present connect problems for calls originating from outside LATA 132. However, for a call originating within a LATA, the NPA and the NXX are required to determine whether a call is local or toll. Until the telephone switch is updated to incorporate a rule for routing calls to the new NXX code of 995, a switch serving LATA 132 will not process calls originating within LATA 132 to the 212-995 exchange, and will instead route calls to a "your call cannot be completed as dialed" announcement. Using the dial plan generator 150 of the present invention, the dial plan of all of the switches of a CLEC may be updated and loaded in a coordinated fashion. A route will be defined for calls originating within LATA 132 that is destined for the 212-995 exchange. Additionally, dial plans for rate centers local to the home rate center will be updated to route calls to the 212-995 exchange as a local call rather than a toll call.

Figure 2:
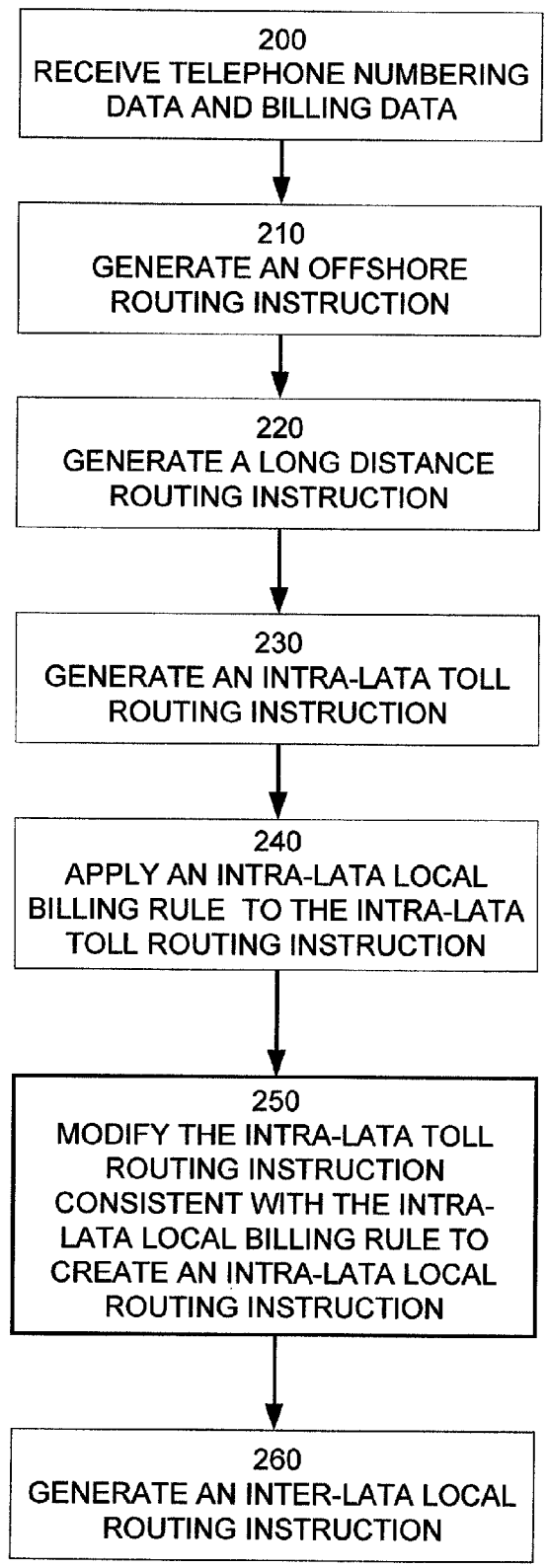
FIG. 2 illustrates a flow diagram of a process by which telephone numbering data and local call data are used to create routing instructions according to an embodiment of the present invention.
Figure 3:
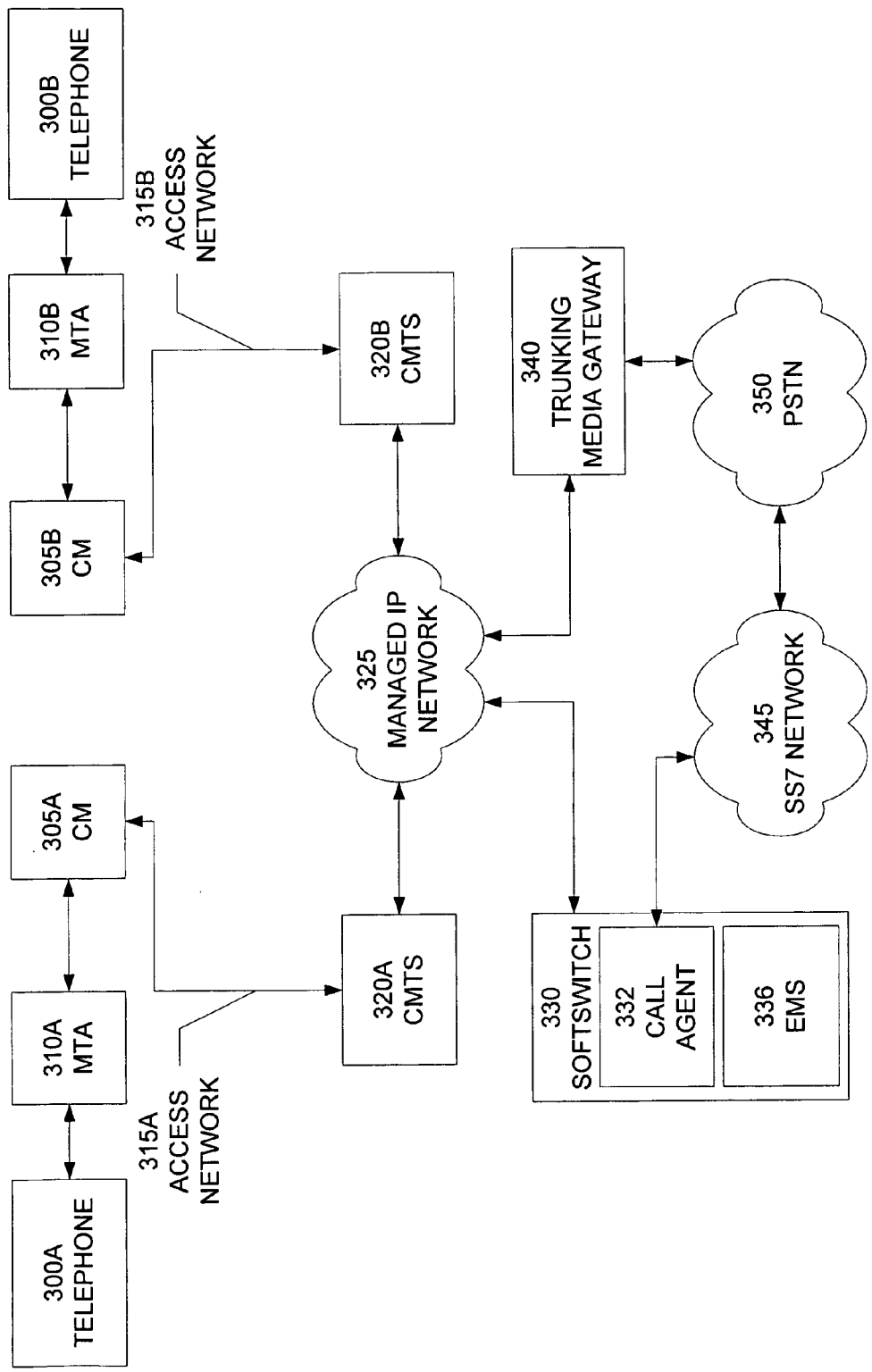
FIG. 3 illustrates the network components of a Packet-Cable-compliant system as known in the art.

FIG. 2 illustrates a flow diagram of a process by which telephone numbering data and local call data are used to create routing instructions according to an embodiment of the present invention.

Referring to FIG. 2, a telephone numbering data and local call data are received at a dial plan generator 200. Based on the telephone numbering data, an offshore routing instruction is generated for a call terminating at an NPA outside the home rate center LATA and outside a single-rate long distance service plan 210. The telephone numbering data are used to generate a long distance routing instruction for a call terminating at an NPA outside the home rate center LATA 220. Again using the telephone numbering data, an intra-LATA toll routing instruction for a call terminating at an NPA within the home rate center LATA is generated 230.

Local call data comprise call billing rules relative to a particular rate center. In particular, the call billing rule relative to local "non-toll" calls define exceptions to the toll routing instructions generated from the telephone numbering data. Referring again to FIG. 2, an intra-LATA local billing rule is applied to the intra-LATA toll routing instruction for a call terminating at an NPA within the home rate center LATA that is within a local calling area 240 to generate an intra-LATA local routing instruction 250. The local routing instruction replaces the toll routing instruction for an NPA-NXX subject to the local billing rule.

Additionally, an inter-LATA local billing rule is applied to generate an inter-LATA local routing instruction for a call terminating at an NPA outside the home rate center LATA that is within the local calling area 260.

The routing instructions can be used to determine how a call originating from rate center will be billed. Once the local calling exceptions have been defined, a call can be identified as long distance, long distance within a plan, toll, or local.

Figure 4:
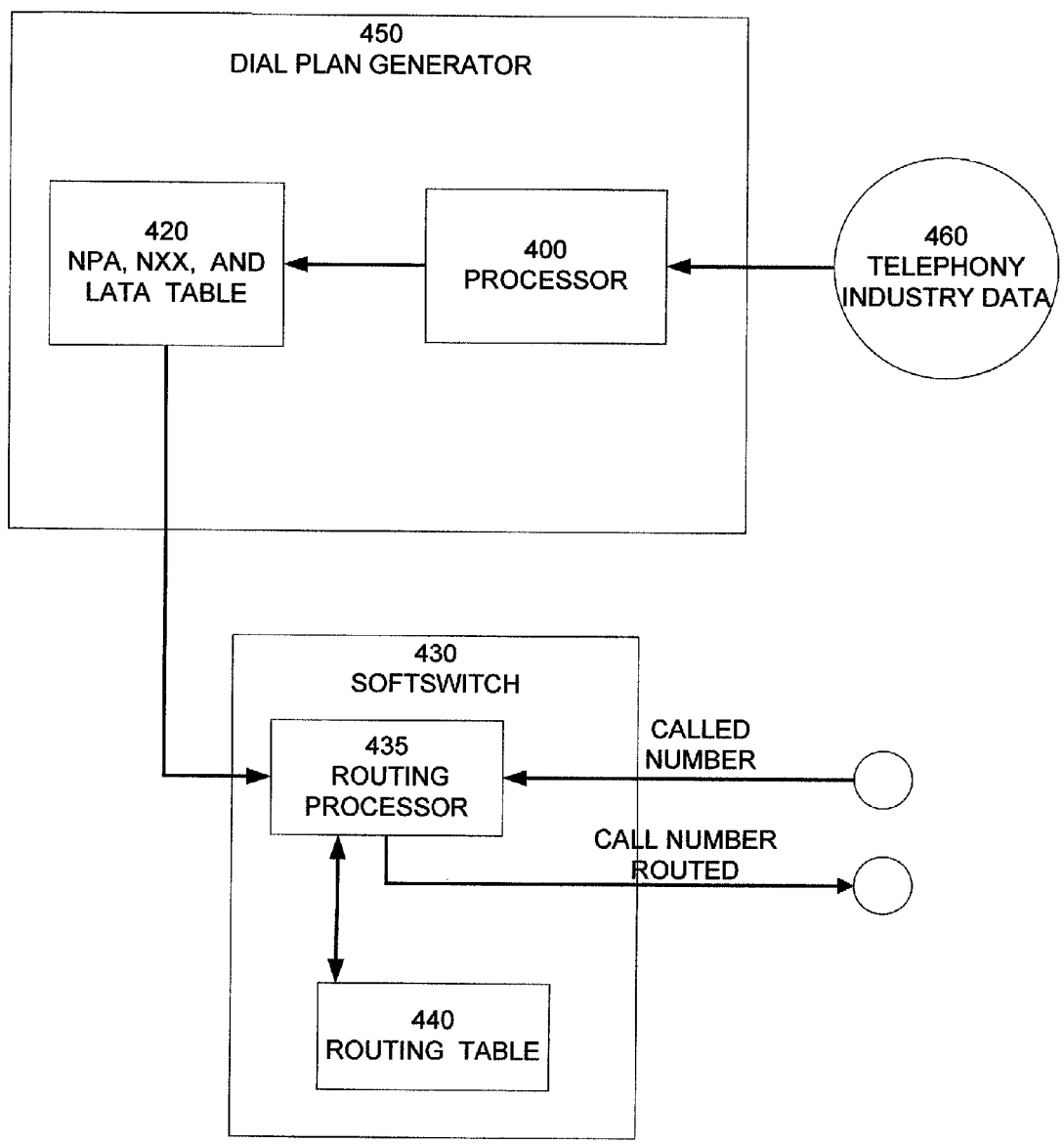
FIG. 4 illustrates a block diagram of the logical components of a LATA-based dial plan generator according to an embodiment of the present invention.

FIG. 4 illustrates a block diagram of the logical components of a LATA-based dial plan generator according to an embodiment of the present invention. In this embodiment, a dial plan generator 450 comprises a master called number table 420 that maps a called NPA-NXX to a LATA identifier. Updates to the telephony industry data 460 are received by processor 400 and used to populate NPA/NXX/LATA table 420. In this embodiment, telephone numbering data comprise an NPA, NXX, and LATA tuple. Using these data, routing processor 435 of softswitch 430 determines the calling LATA from the calling number and the called LATA from the called number. Routing processor 435 then accesses routing table 440 and, using the called LATA and the calling LATA, selects a route for the call. By way of illustration and not as a limitation, a calling LATA/called LATA pair may be routed as a toll long distance call, a long distance plan call, an inter-LATA call, or an intra-LATA call. A CLEC may opt to bill intra-LATA calls as "local" calls and inter-LATA calls as toll calls. However, the dial plan need not discretely identify and route calls based on local calling billing rules.

LATA-based routing dial-plans do not vary from one switch to another. In other words, a switch in California and a switch in Maine can have the same dial-plans, when using LATA-based routing. LATA-based routing is therefore simpler than traditional calling-area-based routing, but it still requires regular updates to its dial-plans as NPA's and NXX's are created or deleted. This is because the first 6 digits of every dialed number (the NPA-NXX) are used to look up the LATA of the dialed number, and similarly for the calling number. Only the master table needs to be updated. The master table may be shared by any number of switches making the updating process very efficient.

Figure 5:
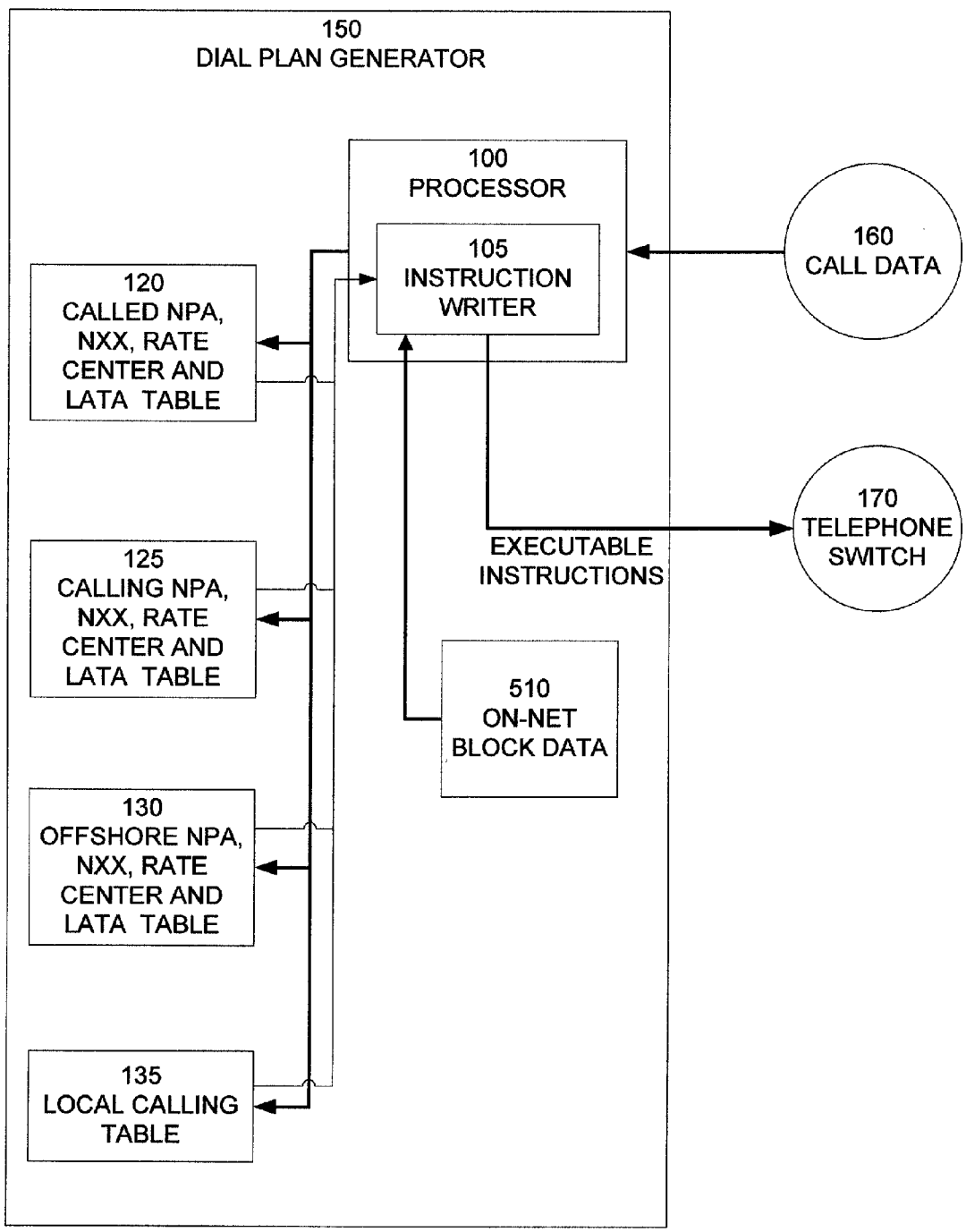
FIG. 5 illustrates a block diagram of the logical components of a dial plan generator according to another embodiment of the present invention.

FIG. 5 illustrates a block diagram of the logical components of a dial plan generator according to another embodiment of the present invention. Referring to FIG. 5, dial plan generator 150 comprises the tables referenced in the description of FIG. 1. Additionally, dial plan generator 150 comprises on-net block data 510. The data from these tables are then read by processor 100 and used by instruction writer 105 to create instructions that are executable by a telephone switch 170. In an embodiment of the present invention, the on-net block data 510 comprise NPA-NXX-# strings that represent blocks of telephone numbers assigned to subscribers of the service provider that operates a softswitch 430 (see, FIG. 4). Such numbers are referred to herein as telephone numbers "native" to the switch.

In the case of on-net calls, instruction writer 105 generates routing instructions that permit a softswitch 430 (see, FIG. 4) to assign a route for the on-net call. In an exemplary embodiment of the present invention, the on-net calls are provided over a PacketCable compliant cable network and the on-net calls are routed to a digital device, such as an on-net modem. By way of illustration and not as a limitation, according to an embodiment of the present invention, a block of numbers 207-899-2000 through 207-899-2999 has been assigned to a softswitch located in Syracuse, N.Y. An instruction to route calls to a number within the on-net number block would be written by instruction writer 105 as:

add dial-plan id=dp-akron-ny; digit-string=207-899-2; dest-id=local-modem.

This instruction directs a softswitch in Syracuse serving a rate center in Akron, N.Y. via the dial plan "dp-akron-ny" to add an instruction to that dial plan that when implemented will route calls comprising the digit-string 207-899-2 to a local modem.

As previously noted, telephone number strings are analyzed by looking for a match of a number string with a routing instruction. A match is first sought for the ten-digit string, then for the nine-digit string counting from left to right, and so on until routing instruction is successfully matched. In the case of ported numbers, the match will be made on the ten-digit string.

A dial plan generator has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A method for generating dial plan instructions for a voice over IP (VoIP) network comprising:
   receiving North American Numbering Plan data (telephone numbering data), wherein the telephone numbering data comprise NPA codes associated with NXX codes;
   receiving local service tariff data (local call data);
   sending the telephone numbering data and the local call data to a dial plan generator, wherein the dial plan generator comprises a processor;
   using the processor to generate a first set of routing instructions from the telephone numbering data and the local call data to be applied to a call originating from the VoIP network, wherein the called number is not associated with a subscriber associated with the VoIP network, (off-net called number) and wherein the first set of routing instructions is executable by the telephone switch and wherein generating the first set of routing instructions comprises:
      generating offshore routing instructions for a call terminating at an NPA outside the LATA from which the call was initiated and outside a single-rate long distance service plan;
      generating long distance routing instructions for a call terminating at an NPA outside the LATA from which the call was initiated;
      generating intra-LATA toll routing instructions for a call terminating at an NPA within the LATA from which the call was initiated;
      generating inter-LATA local routing instructions for a call terminating at an NPA outside the LATA from which the call was initiated that is within the local calling area;
      determining whether one or more of the inter-LATA local routing instructions are common to the long distance routing instructions;
      removing the common inter-LATA local routing instructions from the long distance routing instructions;
      determining whether one or more of the intra-LATA local routing instructions are common to the long distance routing instructions; and
      removing the common intra-LATA local routing instructions from the long distance routing instructions; and
   executing the first set of generated routing instructions in the telephone switch to cause the telephone switch to assign a first route to the off-net call.

2. The method of claim 1 further comprising:
   receiving telephone numbering data relative to subscribers associated with the VoIP network (on-net block data);
   sending the on-net block data and the local call data to the dial plan generator;
   using the processor to generate a second set of routing instructions from the on-net block data and the local call data to be applied to a call originating and terminating from telephone numbers of subscribers associated with the VoIP network, wherein the second set of routing instructions is executable by the telephone switch; and
   executing the second set of generated routing instructions in the telephone switch to cause the telephone switch to assign a second route to the call originating and terminating from telephone numbers of subscribers associated with the VoIP network.

3. The method of claim 1 further comprising using the processor to generate a billing rule based on the first set of routing instructions.

4. A dial plan generator for a voice over IP (VoIP) network comprising:
   a telephone switch; and
   a processor, wherein the processor comprises instructions to cause the processor to:
      receive North American Numbering Plan data (telephone numbering data), wherein the telephone numbering data comprise NPA codes associated with NXX codes;
      receive local service tariff data (local call data);
      generate a first set of routing instructions based on the telephone numbering data and the local call data to be applied to a call originating from the VoIP network, wherein the called number is not associated with a subscriber associated with the VoIP network (off net called number), wherein the first set of routing instructions is executable by the telephone switch and wherein generating the first set of routing instructions comprises:
         generating offshore routing instructions for a call terminating at an NPA outside the LATA from which the call was initiated and outside a single-rate long distance service plan;
         generating long distance routing instructions for a call terminating at an NPA outside the LATA from which the call was initiated;
         generating intra-LATA toll routing instructions for a call terminating at an NPA within the LATA from which the call was initiated;
         generating inter-LATA local routing instructions for a call terminating at an NPA outside the LATA from which the call was initiated that is within the local calling area;
         determining whether one or more of the inter-LATA local routing instructions are common to the long distance routing instructions;
         removing the common inter-LATA local routing instructions from the long distance routing instructions;
         determining whether one or more of the intra-LATA local routing instructions are common to the long distance routing instructions; and removing the common intra-LATA local routing instructions from the long distance routing instructions; and wherein the telephone switch executes the first set of generated routing instructions to cause the telephone switch to assign a first route to the off-net call.

5. The dial plan generator of claim 4, wherein the processor further comprises instructions that cause the processor to:

receive telephone numbering data relative to subscribers associated with the VoIP network (on-net block data); and generate a second set of routing instructions from the on-net block data to be applied to a call originating and terminating from telephone numbers of subscribers associated with the VoIP network, wherein the second set of routing instructions is executable by the telephone switch, and wherein the telephone switch executes the second set of generated instructions to cause the telephone switch to assign a second route to the call originating and terminating from telephone numbers of subscribers associated with the VoIP network.

6. The dial plan generator of claim 4, wherein the processor further comprises instructions that cause the processor to generate a billing rule based on the first set of generated routing instructions.

7. A method for updating a dial plan in a voice over IP (VoIP) network comprising:

receiving updated North American Numbering Plan data (updated telephone numbering data), wherein the telephone numbering data comprise NPA codes associated with NXX codes;

receiving updated service tariff data (updated local call data);

sending the updated telephone numbering data and the local call data to a dial plan generator, wherein the dial plan generator comprises a processor;

using the processor to generate an updated set of routing instructions from the updated telephone numbering data and the updated local call data to be applied to a called number originating from the VoIP network, wherein the called number is not associated with a subscriber associated with the VoIP network (off net called number) and wherein the updated set of routing instructions is executable by the telephone switch and wherein generating the first set of routing instructions comprises:

generating offshore routing instructions for a call terminating at an NPA outside the LATA from which the call was initiated and outside a single-rate long distance service plan;

generating long distance routing instructions for a call terminating at an NPA outside the LATA from which the call was initiated;

generating intra-LATA toll routing instructions for a call terminating at an NPA within the LATA from which the call was initiated;

generating inter-LATA local routing instructions for a call terminating at an NPA outside the LATA from which the call was initiated that is within the local calling area;

determining whether one or more of the inter-LATA local routing instructions are common to the long distance routing instructions;

removing the common inter-LATA local routing instructions from the long distance routing instructions;

determining whether one or more of the intra-LATA local routing instructions are common to the long distance routing instructions; and removing the common intra-LATA local routing instructions from the long distance routing instructions; and executing the updated set of routing instructions in the telephone switch to assign an updated route to the off-net call.

8. The method of claim 7 further comprising using the processor to generate updated billing rules based on the updated set of routing instructions.

9. A dial plan generator for updating a dial plan of a voice over IP (VoIP) network comprising:

a processor;

a telephone switch, wherein the processor comprises instructions that cause the processor to:

receive North American Numbering Plan data (updated telephone numbering data), wherein the telephone numbering data comprise NPA codes associated with NXX codes; and receive updated service tariff data (updated local call data); and generate an updated set of routing instructions from the updated telephone numbering data and the updated local call data to be applied to a called number originating from the VoIP network, wherein the called number is not associated with a subscriber associated with the VoIP network (off net called number), wherein the updated set of routing instructions is executable by the telephone switch and wherein generating the updated set of routing instructions comprises;

generating offshore routing instructions for a call terminating at an NPA outside the LATA from which the call was initiated and outside a single-rate long distance service plan;

generating long distance routing instructions for a call terminating at an NPA outside the LATA from which the call was initiated;

generating intra-LATA toll routing instructions for a call terminating at an NPA within the LATA from which the call was initiated;

generating inter-LATA local routing instructions for a call terminating at an NPA outside the LATA from which the call was initiated that is within the local calling area;

determining whether one or more of the inter-LATA local routing instructions are common to the long distance routing instructions;

removing the common inter-LATA local routing instructions from the long distance routing instructions;

determining whether one or more of the intra-LATA local routing instructions are common to the long distance routing instructions; and removing the common intra-LATA local routing instructions from the long distance routing instructions; and wherein the telephone switch executes the updated set of routing instructions to cause the telephone switch to assign an updated route to the off-net call.

10. The dial plan generator of claim 9, wherein the processor further comprises instructions that cause the processor to generate updated billing rules based on the updated set of routing instructions.

11. A method for billing telephone calls originating from within a voice over IP (VoIP) network comprising:
  receiving North American Numbering Plan data (telephone numbering data), wherein the telephone numbering data comprise NPA codes associated with NXX codes;
  receiving local service tariff data (local call data);
  sending the telephone numbering data and the local call data to a dial plan generator, wherein the dial plan generator comprises a processor;
  using the processor to generate a first set of routing instructions from the telephone numbering data and the local call data to be applied to a call originating from the VoIP network, wherein the called number is not associated with a subscriber associated with the VoIP network (off net called number), wherein the first set of routing instructions is executable by the telephone switch and wherein generating the first set of routing instructions comprises;
    generating offshore routing instructions for a call terminating at an NPA outside the LATA from which the call was initiated and outside a single-rate long distance service plan;
    generating long distance routing instructions for a call terminating at an NPA outside the LATA from which the call was initiated;
    generating intra-LATA toll routing instructions for a call terminating at an NPA within the LATA from which the call was initiated;
    generating inter-LATA local routing instructions for a call terminating at an NPA outside the LATA from which the call was initiated that is within the local calling area;
    determining whether one or more of the inter-LATA local routing instructions are common to the long distance routing instructions;
    removing the common inter-LATA local routing instructions from the long distance routing instructions;
    determining whether one or more of the intra-LATA local routing instructions are common to the long distance routing instructions; and
    removing the common intra-LATA local routing instructions from the long distance routing instructions;
  executing the first set of generated routing instructions in the telephone switch to cause the telephone switch to assign a first route to the off-net call; and
  billing for the off-net called number based on the assigned first route.

12. The method of claim 11, further comprising:
  receiving telephone numbering data relative to a subscriber associated with the VoIP network (on-net block data);
  sending the on-net block data and the local call data to the dial plan generator;
  using the processor to generate a second set of routing instructions to be applied to a call originating and terminating from telephone numbers of subscribers associated with the VoIP network, wherein the second set of generated routing instructions is executable by the telephone switch to assign a second route to the called number native to the switch;
  executing the second set of generated routing instructions in the telephone switch to cause the telephone switch to assign a second route to the call originating and terminating from telephone numbers of subscribers associated with the VoIP network; and
  billing for the on-net call based on the assigned second route.

13. The method of claim 2 further comprising using the dial plan generator to generate a billing rule based on the second set of generated routing instructions.

14. The method of claim 5 further comprising using the dial plan generator to generate a billing rule based on the second set of generated routing instructions.

15. The method of claim 2, wherein the telephone switch is a softswitch.

16. The dial plan generator of claim 5, wherein the telephone switch is a softswitch.

17. The method of claim 11, wherein the telephone switch is a softswitch.

* * * * *